United States Patent [19]
Simanis et al.

[11] Patent Number: 5,168,522
[45] Date of Patent: Dec. 1, 1992

[54] WIRELESS TELEPHONE WITH FREQUENCY INVERSION SCRAMBLING

[75] Inventors: Joseph F. Simanis, Hoffman Estates; Robert N. Weisshappel, Barrington, both of Ill.

[73] Assignee: Motorola, Inc., Schaumburg, Ill.

[21] Appl. No.: 755,970

[22] Filed: Sep. 6, 1991

[51] Int. Cl.⁵ ............................................. H04K 1/00
[52] U.S. Cl. ..................................................... 380/38
[58] Field of Search ................................. 380/9, 33, 38

[56] References Cited

U.S. PATENT DOCUMENTS

| | | | |
|---|---|---|---|
| 4,228,321 | 10/1980 | Flanagan | 380/33 |
| 4,411,017 | 10/1983 | Talbot | 380/9 |
| 4,555,805 | 11/1985 | Talbot | 380/33 |
| 4,827,507 | 5/1989 | Marry et al. | 380/38 |
| 4,920,567 | 4/1990 | Malek | 380/9 |
| 4,972,479 | 10/1990 | Tobias, Jr. et al. | 380/33 |
| 4,989,230 | 1/1991 | Gillig | 379/59 |
| 5,140,635 | 8/1992 | Houghton et al. | 380/38 |

OTHER PUBLICATIONS

Popular Science Magazine, Jun. 1991, "What's New", p. 17.

Primary Examiner—Salvatore Cangialosi
Attorney, Agent, or Firm—Kenneth W. Bolvin

[57] ABSTRACT

The wireless telephone of the present invention is comprised of a base unit, coupled to a land-line telephone system, and a remote unit that communicates with the base unit over radio frequencies. The remote unit has scrambling circuits (207 and 216) for encrypting voice signals transmitted to the base unit and decrypting voice signals received from the base unit. The base unit also has scrambling circuits (107 and 116) for encrypting voice signals transmitted to the remote unit and decrypting voice signals received from the remote unit. The wireless telephone uses a keypad (222) for initiating a demonstration mode that allows both parties to the conversation to hear the scrambled voice signal.

11 Claims, 3 Drawing Sheets

SCRAMBLING CIRCUIT
107, 116, 207, 216

WIRELESS TELEPHONE WITH FREQUENCY INVERSION SCRAMBLING

FIELD OF THE INVENTION

The present invention relates generally to the field of communications and particularly to signal scrambling between a base and remote wireless telephone.

BACKGROUND OF THE INVENTION

Cordless or wireless telephones are typically home units that consist of a base unit and one or more remote units. An example of such a cordless telephone is seen in U.S. Pat. No. 4,989,230 to Gillig et al., assigned to Motorola, Inc., and is incorporated herein by reference. The remote units communicate with the base unit over radio frequencies (RF) typically within a range of 1000 feet of the base unit. The base unit is connected to the land-line telephone system, thus allowing a remote user to communicate with other land-line telephones.

The problem with this type of system, however, is that the RF signals can be received by anyone with a receiver tuned to the frequency being used by the cordless telephone. This makes it difficult to have a private conversation using a cordless telephone. Cordless telephones that scramble the RF voice signal don't provide for testing the scrambling function to determine if it is working properly. There is a resulting need for a cordless telephone that makes it difficult for the RF voice signals to be listened to and also enable the scrambling function to be checked for proper operation.

SUMMARY OF THE INVENTION

The wireless communication system of the present invention is comprised of a base unit, coupled to a land-line telephone system, and a remote unit that communicates with the base unit over radio frequencies. The remote unit is comprised of encryption means, located in the transmit path of the remote unit, for encrypting voice signals transmitted to the base unit and decryption means, located in a receive path of the remote unit, for decrypting voice signals received from the base unit. The base unit is comprised of encryption means, located in a transmit path of the base unit, for encrypting voice signals transmitted to the remote unit and decryption means, located in a receive path of the base unit, for decrypting voice signals received from the remote unit. The wireless communication system has control entry means, located in the remote unit, for generating a control signal to disable the decryption means in the remote and base units.

DETAILED DESCRIPTION OF THE PREFERRED EMBODIMENT

The wireless telephone of the present invention uses scrambled RF voice signals to communicate between the base unit and the remote unit. By disabling some of the scrambling circuits in the remote or both the remote and the base, both parties to the telephone call can determine that the scrambling function is operational.

Figure 1:
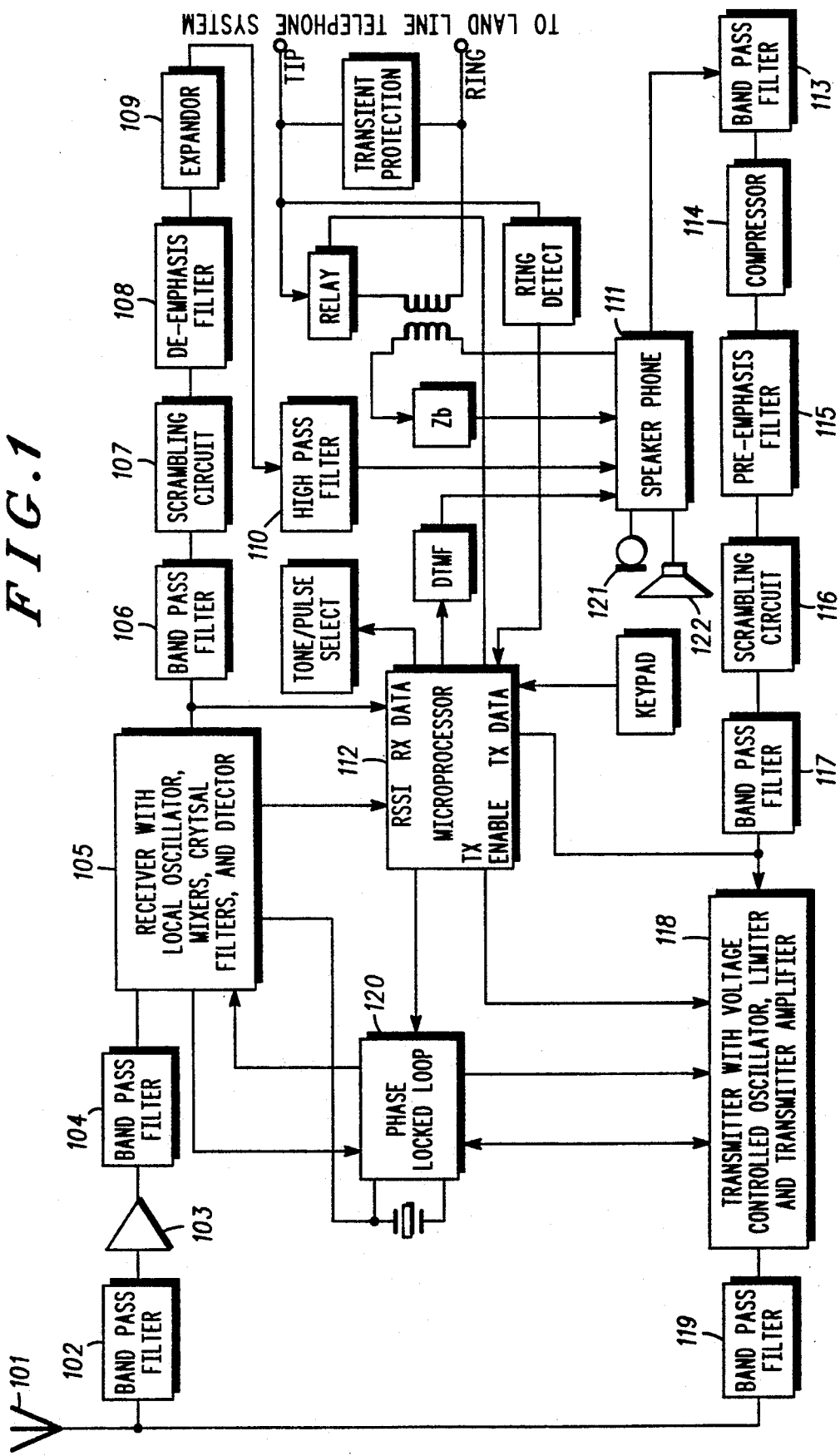
FIG. 1 shows a block diagram of a base unit of the present invention.
Figure 2:
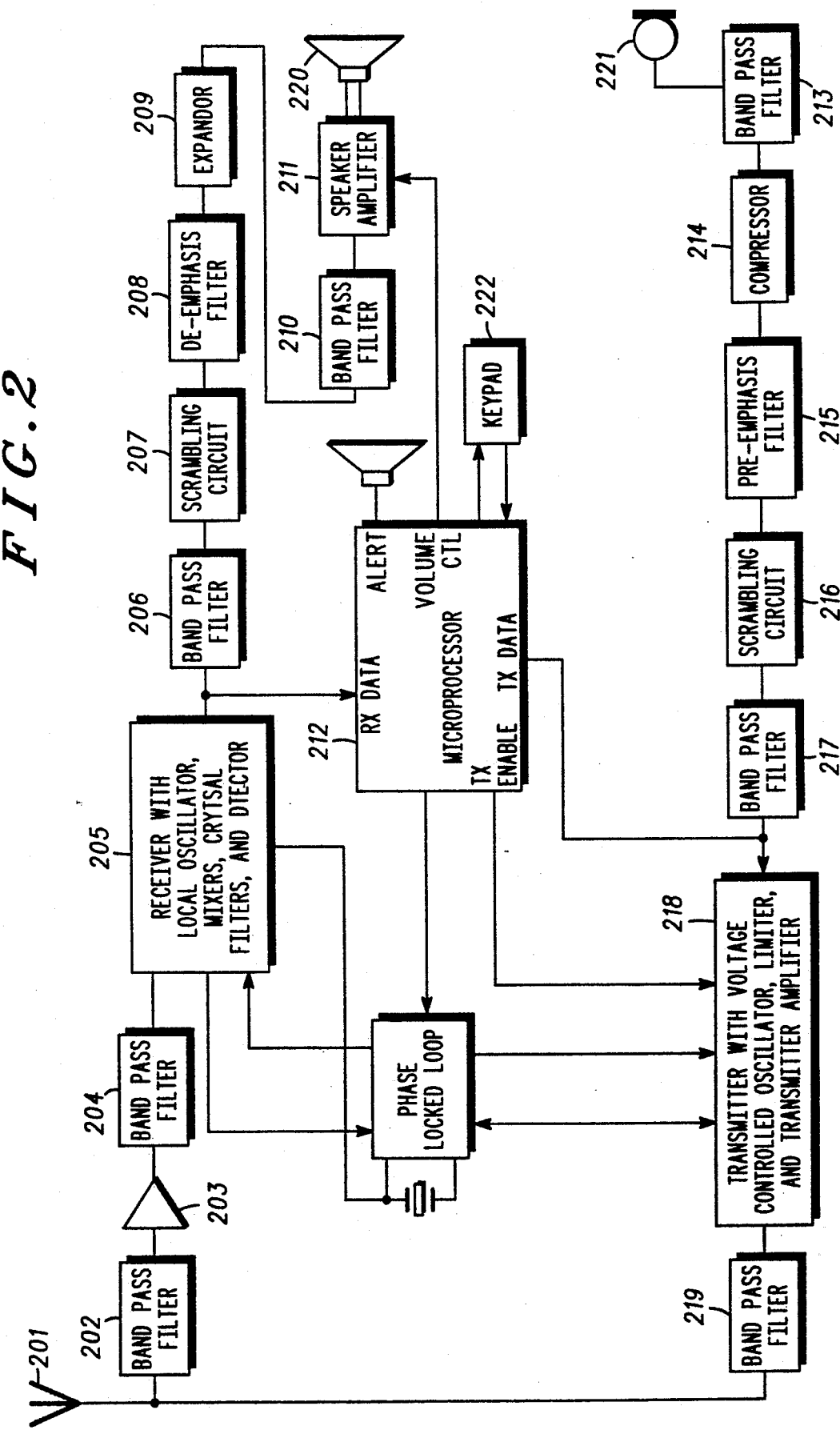
FIG. 2 shows a block diagram of a remote unit of the present invention.

The block diagram of FIG. 1 illustrates a preferred embodiment of a cordless telephone base unit having a control-crypting signals. This particular base unit also includes a speakerphone. FIG. 2 illustrates a preferred embodiment of a remote unit for communicating with the base unit, the remote also having a controllable scrambling or encryption circuit for encrypting and decrypting signals.

Referring to FIG. 1, the base unit is comprised of an antenna (101) that is coupled to the receive and transmit paths of the base. The receive path is comprised of a bandpass filter (102) that allows the frequencies of 49.670–49.990 MHz to pass. The filter is connected to a receive amplifier (103) that amplifies the filtered signal by approximately 18 dB. The output of the amplifier is then filtered by another bandpass filter (104) before being input to the receiver (105). In the preferred embodiment, the receiver is an MC3363 available from Motorola, Inc.

The receiver (105) mixes the signal down to 10.7 MHz and then to 455 kHz. This signal is then demodulated. The local oscillators in the receiver (105) are controlled by a phase locked loop (120) whose frequency is controlled by a microprocessor (112). The microprocessor (112) also receives a carrier detect signal, labeled RSSI in FIG. 1, and the demodulated signal from the receiver (105), labeled RX Data. The demodulated signal is used by the microprocessor (112) to interpret coded data messages transmitted by the remote unit. These coded data messages are used for DTMF dialing, telephone hook switch control, and control of the scrambling circuit. The carrier detect signal is used to detect the presence of a transmitter occupying the base unit receive channel. In the preferred embodiment, the microprocessor (112) is an MC68HCL05C4 available from Motorola, Inc.

The output of the receiver (105) is filtered again by another bandpass filter (106). The output of the filter (106) is input to the scrambling circuit (107). In the preferred embodiment, the scrambling circuit (107) is an MX108DW Full-Duplex Voiceband Scrambler integrated circuit available from MX.Com, Inc.

The unscrambled output of the scrambler circuit (107) is filtered in a de-emphasis filter (108) before being input to an expander (109). The expansion process applies gain to the input signal that is varied as a function of the signal magnitude. The effective gain being greater for large magnitude signals and less for small magnitude signals. After this signal has been filtered by a highpass filter (110), it is input to a speakerphone circuit (111) and is also output to the land-line telephone system. If the speakerphone is being used, such as in a three way call between the base, the remote, and a land-line party, the audio signal is output to the base unit's speaker.

The transmit path of the base is comprised of the audio signal, either from the microphone (121) of the speakerphone or the land-line party, being bandpass filtered (113) before going through a compressor (114). The compressor (114) applies gain to the audio signal that is varied as a function of the signal magnitude, the effective gain being greater for small signals. An example of a compandor (compressor/expander) is MC33110 manufactured by Motorola, Inc. The dynamic range of the compandor is 80 dB.

The output of the compressor (114) is input to a pre-emphasis filter (115) before being scrambled by the scrambler circuit (116). The scrambler circuit (116) is the second half of the same integrated circuit used to unscramble the received signal. The scrambled audio signal is bandpass filtered (117) before being modulated by the transmitter (118) to a frequency in the range of 46.610-46.970 MHz. The actual frequency used by the telephone can be user selectable by a switch or other control on the telephone base or remote. Both the receive and transmit frequency ranges are set by the FCC for all cordless telephones. An example of a transmitter is MC2833 manufactured by Motorola, Inc.

The output of the transmitter is bandpass filtered (119) to filter out the signal outside the 46.610-46.970 MHz range. This signal is then transmitted from the antenna (101) to the remote unit.

The remote unit is comprised of the antenna (201) that receives the signal from the base unit. A bandpass filter (202) removes that part of the signal outside the range of 46.610-46.970 MHz. A gain of approximately 18 dB is then applied to the signal by a receive amplifier (203) before it is bandpass filtered (204) again. This signal is then input to the receiver (205).

The remote unit receiver (205) mixes the signal down to 10.7 MHz and then to 455 kHz. This signal is then demodulated. The demodulated signal, labeled RX Data, is input to the microprocessor (212) to interpret the coded data messages transmitted by the base unit. These coded data messages are used to control the remote ringer and the scrambling circuit.

The demodulated signal is also bandpass filtered (206) before being input to the scrambler circuit (207) for descrambling. The scrambler circuit (207) is identical to the integrated circuit used in the base unit.

The unscrambled output is filtered by a de-emphasis filter (208) before going through an expander (209). The expanded signal is bandpass filtered (210) and amplified (211). The amplifier (211) is controlled by the microprocessor (212). By operating a control on the remote unit, the user can increase or decrease the speaker (220) volume by increasing or decreasing the gain applied to the signal at this point. The amplified signal is input to the earpiece speaker of the remote unit.

The microphone (221) of the remote generates the audio signal that is bandpass filtered (213), compressed (214), and filtered by a pre-emphasis filter (215) before being processed by the scrambler circuit (216). This circuit (216) is the second half of the integrated circuit used to unscramble the received signal.

The scrambled signal is bandpass filtered (217) before being modulated to a frequency in the range of 49.67-49.99 MHz by the transmitter (218). The modulated signal is bandpass filtered (219) to remove the signal outside this frequency range and is transmitted on the remote's antenna (201).

The keypad on the remote (222) is used to take the telephone off hook, enter telephone numbers, change the frequency used to communicate with the base, and to enable the scramble demonstration function. The keypad enables the scrambling demonstration function by telling the microprocessor to generate a control signal to the scrambling integrated circuit. In the preferred embodiment, the base unit also has a keypad.

The control signals in both the remote and the base units are connected to the transmitter after the scrambling function so that these signals are not scrambled. The control signals, generated by the microprocessor, are wire-ORed with the scrambled voice signal to the transmitter input.

The scrambling of the signal between the remote and the base is operating continuously. This scrambling, however, is not evident to the telephone user or the party on the other end of the call. It would not be known, therefore, if the scrambling was operating properly. The scrambling demonstration process of the present invention provides both parties to the telephone call the ability to hear the scrambled version of the signal.

Figure 3:
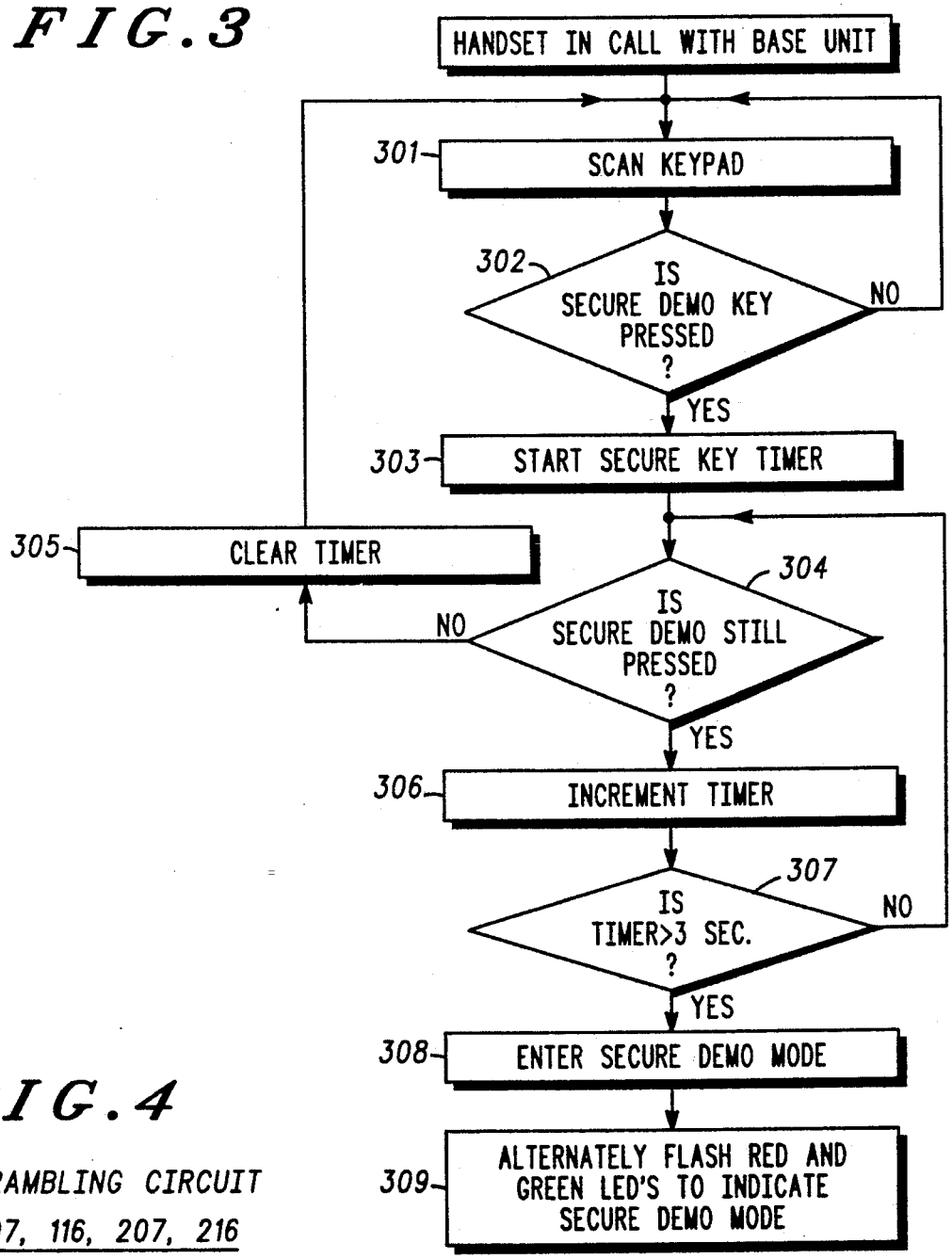
FIG. 3 shows a flowchart of the process of the present invention.

The scrambling demonstration process is illustrated in FIG. 3. While the telephone is in a call, the keypad is scanned (301) by the microprocessor for the depression of a key, such as a Secure Demo key, that indicates that the remote unit user wishes to enter the scrambling demonstration mode. In the preferred embodiment, this mode is referred to as the Secure Demo mode.

If the key is depressed (302), a timer in the microprocessor is started (303). If the key is released immediately (304), the timer is cleared (305) and the keypad scanned again (301). If the key is still depressed (304), the timer is incremented (306) and checked to determine if the key has been depressed for at least 3 seconds (307). This time check is continued until the key has been depressed for 3 seconds. At this point, the scrambling demonstration mode is operating (308). This can be indicated on the remote or the base by flashing indicator lights (309). The remote keypad may be used for the above process or, if the base has a keypad, this keypad may be used to enter the scrambling demonstration mode.

Figure 4:
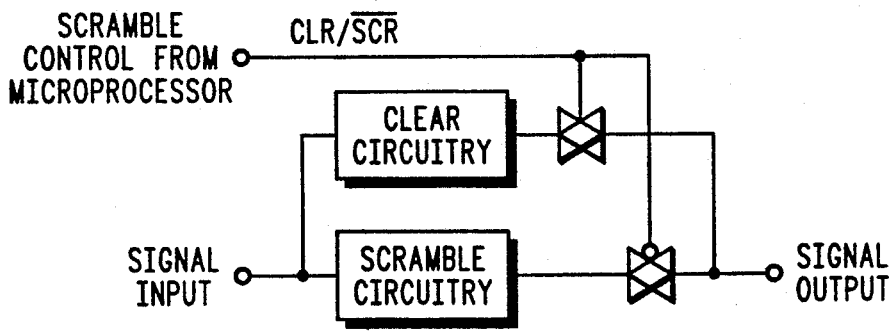
FIG. 4 shows a block diagram of the scrambler integrated circuit.

The block diagram of the MX108DW Full-Duplex Voiceband Scrambler integrated circuit is illustrated in FIG. 4. Since this integrated circuit uses frequency inversion scrambling, a signal that is input to the circuit that has already been scrambled will be returned to normal by the circuit.

In order to put the telephone into the scrambling demonstration mode, the MX108DW must be able to transmit the input signal without scrambling. This is accomplished by the control input labeled Clear/Scramble. By applying a logic one to this input, the signal is transmitted through the path via the clear path. A logic zero on this control input will cause the signal to be transmitted through the path via the scramble path.

The preferred embodiment of the present invention disables the entire scrambling integrated circuit in the remote unit when the scrambling demonstration mode is initiated. This allows the scrambled audio signal to be heard by both the telephone user and the land-line party to the conversation.

In an alternate embodiment, the scrambling circuits in the receive paths of both the base and remote units are disabled in the scrambling demonstration mode. This embodiment, however, requires that a command be sent by the unit that is initiating the scrambling demonstration mode to the other unit, instructing the receiving unit to disable the receive path scrambling circuit. This command can be transmitted during block (308) of FIG. 3.

In another embodiment of the present invention, the base speakerphone can also have a scrambling circuit. This allows a conversation between the speakerphone and the land-line party to also use the scrambling demonatration mode. This can be enabled in the same manner is illustrated in FIG. 3.

The preferred embodiment disables the scrambling circuits until any key is depressed, causing the disabled scrambling circuits to be enabled. Alternate embodiments can disable the scrambling circuits for a predetermined time. The scrambling circuits can also be enabled, and thus the scrambling demonstration mode ended, upon hang-up of the call in progress.

In summary, a wireless or cordless telephone having controllable scrambling between the remote unit and the base unit has been shown, thus providing secure conversations between the telephone user and the land-line party. Using the present invention, telephone user can still enjoy the convenience of a cordless telephone without unwanted parties listening to the conversation. Additionally, the present invention allows the scrambled signal to be heard by each party, in a demonstration mode, to determine that the scrambling circuitry is operating properly.

We claim:

1. A wireless communication system having a base unit, coupled to a land-line telephone system, and a remote unit, the remote unit communicating with the base unit over a communication medium, the system comprising:

first frequency inversion encryption means, located in a transmit path of the remote unit, for encrypting voice signals transmitted to the base unit;

first frequency inversion decryption means, located in a receive path of the remote unit, for decrypting voice signals received from the base unit;

second frequency inversion encryption means, located in a transmit path of the base unit, for encrypting voice signals transmitted to the remote unit;

second frequency inversion decryption means, located in a receive path of the base unit, for decrypting voice signals received from the remote unit; and control entry means for generating a control signal to disable the first and second frequency inversion decryption means.

2. The system of claim 1 wherein the first and second frequency inversion decryption means are disabled for a predetermined time.

3. The system of claim 1 wherein the first and second frequency inversion decryption means are disabled until the control entry means generates a control signal to enable them.

4. The system of claim 1 wherein the first and second frequecy inversion decryption means are enabled when an ongoing telephone call is terminated.

5. A wireless communication system, comprising:

a base unit having a receive path and a transmit path, the receive path comprising: first receiving means, for receiving voice and control signals and first frequency inversion decryption means for decrypting the voice signals, the transmit path comprising: first transmitting means for transmitting voice signals and first frequency inversion encryption means for encrypting the voice signals;

a remote unit that communicates over radio frequencies with the base unit, the remote unit having a receive path and a transmit path, the receive path comprising: second receiving means, for receiving the voice signals and second frequency inversion decryption means for decrypting the voice signals, the transmit path comprising: electro-audio transducer means for generating voice signals, second frequency inversion encryption means for encrypting the voice signals, and second transmitting means for transmitting the voice and control signals to the base unit; and control entry means for generating the control signals that disable the first and second frequency inversion decryption means.

6. The system of claim 5 wherein the control entry means is located in the remote unit.

7. The system of claim 5 wherein the control entry means is located in the base unit.

8. The system of claim 5 wherein both the remote unit and the base unit contain control entry means.

9. A wireless communication system having a base unit, coupled to a land-line telephone system, and a remote unit that communicates with the base unit over radio frequencies, the system comprising:

first frequency inversion encryption means, located in a transmit path of the remote unit, for encrypting voice signals transmitted to the base unit;

first frequency inversion decryption means, located in a receive path of the remote unit, for decrypting voice signals received from the base unit;

second frequency inversion encryption means, located in a transmit path of the base unit, for encrypting voice signals transmitted to the remote unit; p1 second frequency inversion decryption means, located in a receive path of the base unit, for decrypting voice signals received from the remote unit; and control entry means, located in the remote unit, for generating a control signal to disable the first frequency inversion decryption means and the first frequency inversion encryption means.

10. A method for enabling a scrambling demonstration mode in a communications device having a base unit and a remote unit, the base unit coupled to a land-line telephone system, the base and remote units communicating with each other by frequency inversion scrambled voice signals transmitted at radio frequencies, at least the remote unit having a keypad, the method comprising the steps of:

scanning the keypad for the activation of a scrambling demonstration key; and is the scrambling demonstration key is activated for a predetermined time, enabling the scrambling demonstration mode to allow the scrambled voice signals to be heard at least by a user of the remote unit and a user of the land-line telephone system.

11. The method of claim 10 wherein the predetermined time is 3 seconds.

* * * * *

UNITED STATES PATENT AND TRADEMARK OFFICE
CERTIFICATE OF CORRECTION

PATENT NO. : 5,168,522

DATED : December 1, 1992

INVENTOR(S) : Joseph F. Simanis and Robert N. Weisshappel

It is certified that error appears in the above-identified patent and that said Letters Patent is hereby corrected as shown below:

Column 6, line 35, please delete "pl" and instead please replace it with a return.

Column 6, line 53, please change the word "is" to --if--.

Signed and Sealed this

Twelfth Day of October, 1993

Attest:

Attesting Officer

BRUCE LEHMAN

Commissioner of Patents and Trademarks